April 11, 1961     E. MAYE     2,979,306
FLUID DRIVE MECHANISM

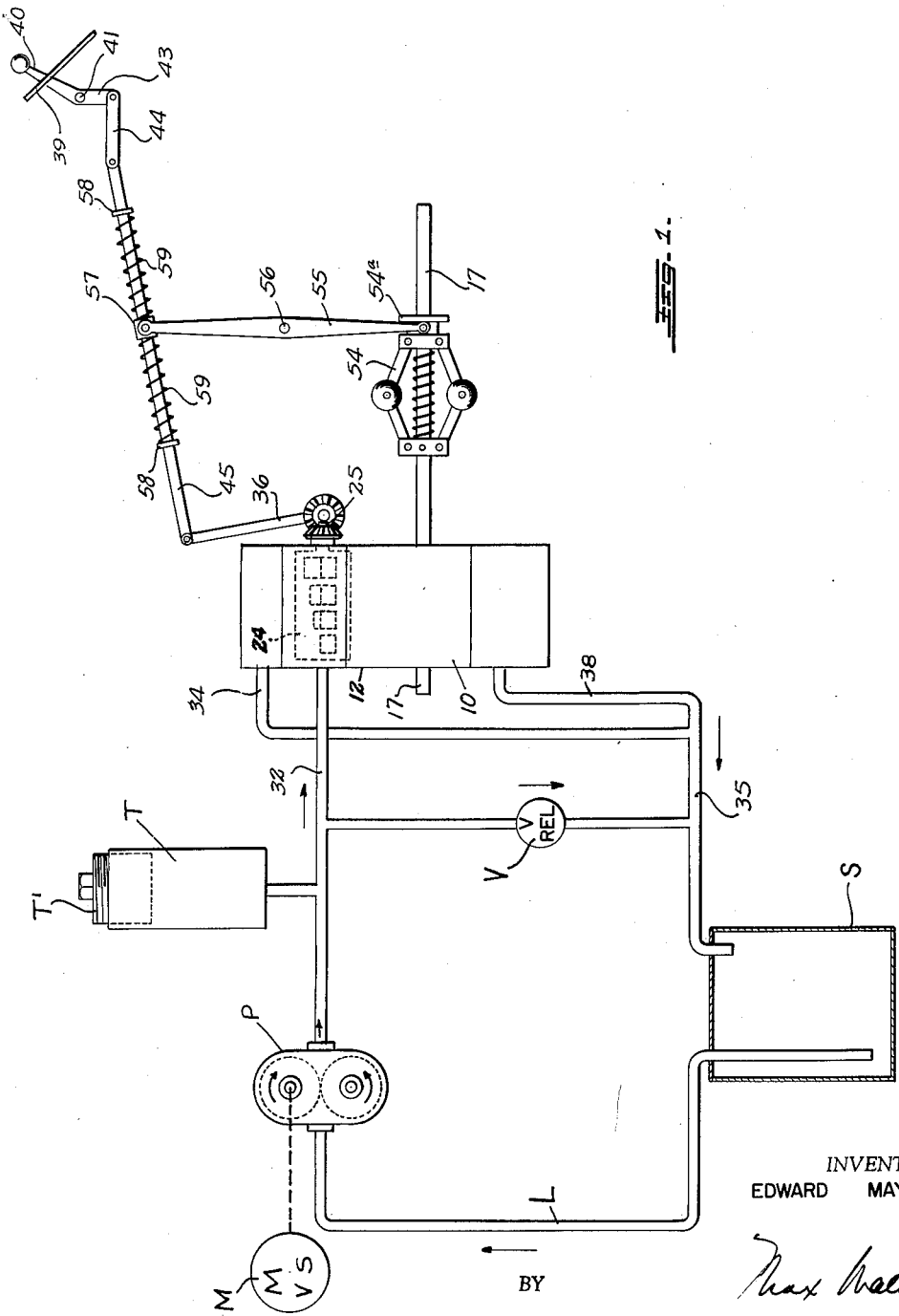

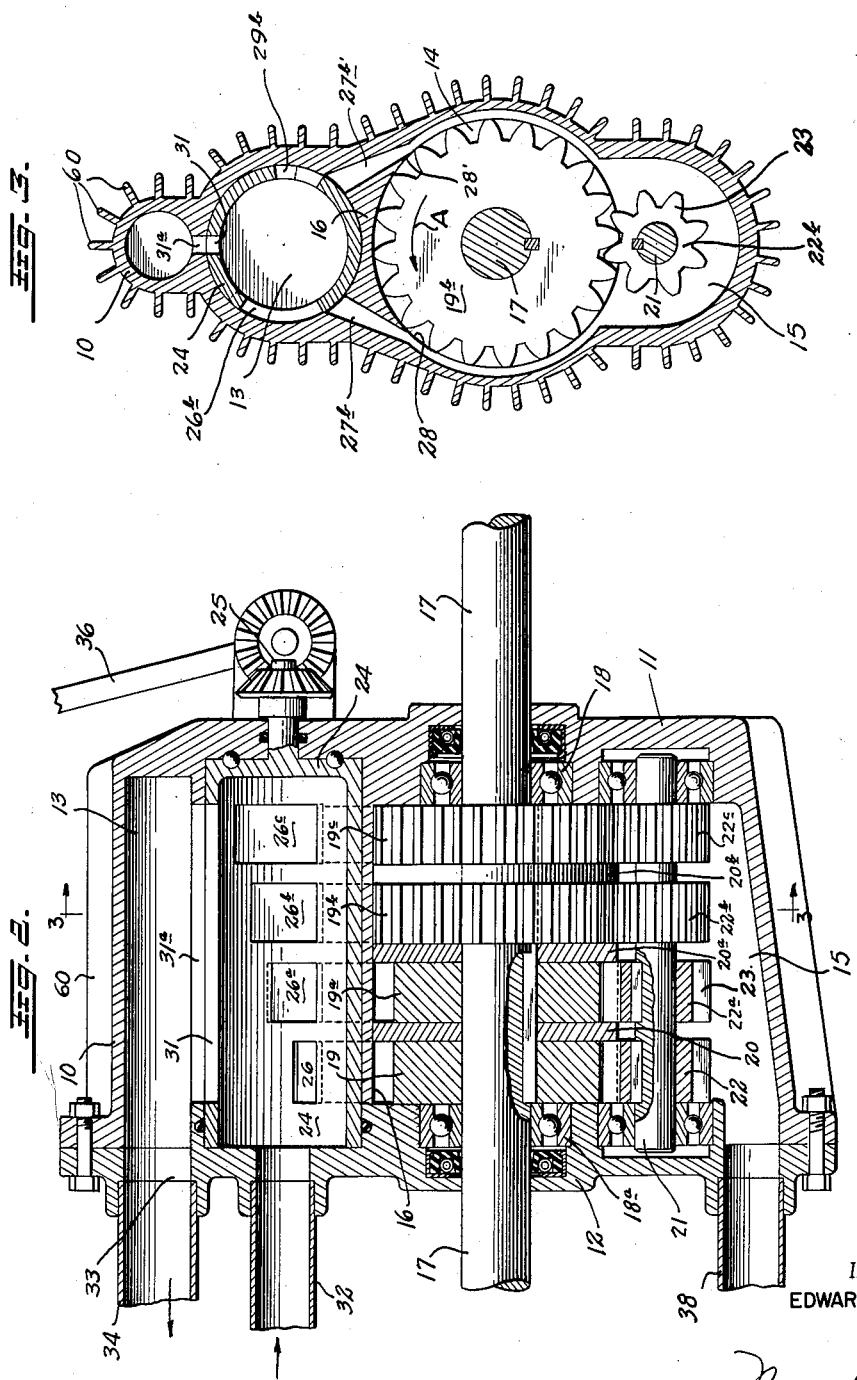

Filed Nov. 16, 1956     4 Sheets-Sheet 3

INVENTOR
EDWARD MAYE

BY

ATTORNEY

April 11, 1961 E. MAYE 2,979,306
FLUID DRIVE MECHANISM
Filed Nov. 16, 1956 4 Sheets-Sheet 4

INVENTOR
EDWARD MAYE

BY

ATTORNEY

United States Patent Office 2,979,306
Patented Apr. 11, 1961

2,979,306

FLUID DRIVE MECHANISM

Edward Maye, 224 Rogers Drive, Falls Church, Va.

Filed Nov. 16, 1956, Ser. No. 622,549

5 Claims. (Cl. 253—105)

This invention relates to a fluid drive mechanism and system incorporating the same, and more particularly to a variable, speed changing mechanism which employs a fluid as the driving medium, and which may be controlled automatically or manually. While particularly adapted for automotive vehicles, it may be used in the operation of other machines, self-propelled or otherwise, where a compact, efficient drive requiring variable speeds is employed.

The essential feature of the invention is that the mechanism, simple in construction and operation, is capable of feeding liquid under pressure through a simple, variable control valve having a series of separate orifices which increase in size in the direction of the line of flow of the liquid, each orifice directing liquid in the form of a jet to a turbine, the shifting of the valve successively shutting off said orifices in the increasing order of their size, until all except the last orifice is closed, all the fluid being then directed through said last open orifice to the turbine. With the pressure and volume of flow remaining constant and directed through the final orifice against the turbine, said turbine is driven at the same speed as the prime mover. The turbine comprises a series of runners all mounted in spaced relation upon the same driven shaft, and the mechanism is capable of idling, forward and reverse drives, and an overdrive.

The device contemplates a prime mover driving a liquid pressure pump, producing a fluid flow which actuates a group of runners of a turbine connected to a driven shaft, and which may be driven in either direction by the fluid stream or streams produced by the pump and controlled by a valve, a governor being provided to regulate the final driving speed and to provide for an automatic control for the drive. If the volume of fluid handled by the turbine is less than the capacity of the pump, the driven shaft will operate at a higher speed than the prime mover, thus constituting a simple overdrive. An overdrive in connection with an automatic, variable speed transmission has heretofore been a prohibitively complicated mechanism, and the present invention contemplates a practical and simple innovation.

Among the objects of the invention are: to provide a positive fluid drive mechanism which delivers the power received from the prime mover with a minimum of power loss; which comprises fewer and simpler parts than heretofore known in fluid drive mechanisms, and theretofore is economical to build and maintain; which is easier to operate and combines manual and automatic operation; which embodies only one simple valve for its control and operation; which includes an inherently built-in overdrive, eliminating additional mechanisms for this purpose, and which permits the pressure of the liquid in the system to be used as a brake, for example, where the drive is used in an automotive vehicle. This drive mechanism, because of the relatively few moving parts and the absence of slippage between the parts, also eliminates much of the heat generated in the known fluid drive mechanisms.

Other objects and advantages will become apparent from the following description, taken together with the attached drawings, in which Figure 1 is a diagrammatic view showing the drive mechanism incorporated in an operating system.

Figure 2 is a central, vertical, sectional view, with parts in elevation, of the drive mechanism taken substantially along the line 2—2 of Figure 3.

Figure 3 is a vertical, sectional view, with parts in elevation, of the drive mechanism, taken along the line 3—3 of Figure 2.

Figure 5:
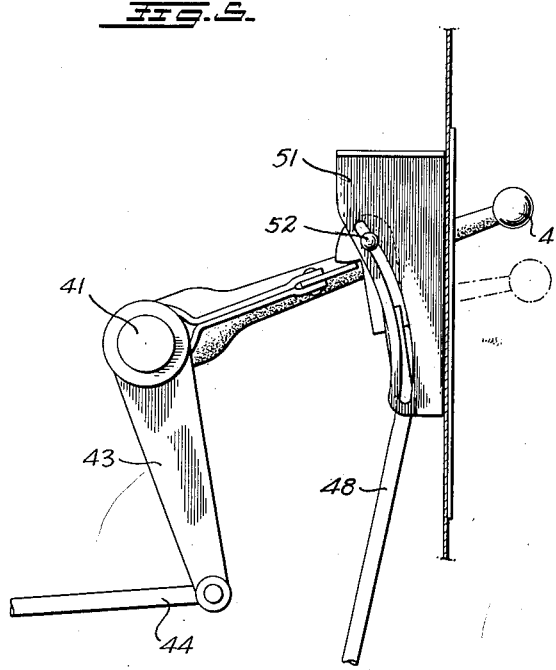
Figure 6:
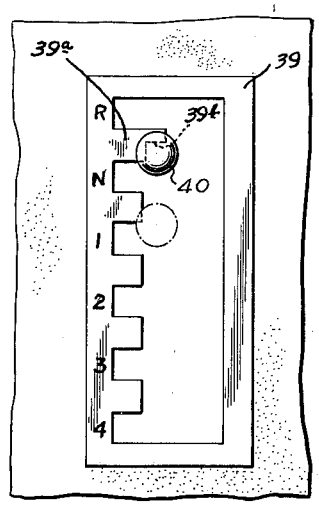
Figure 7:
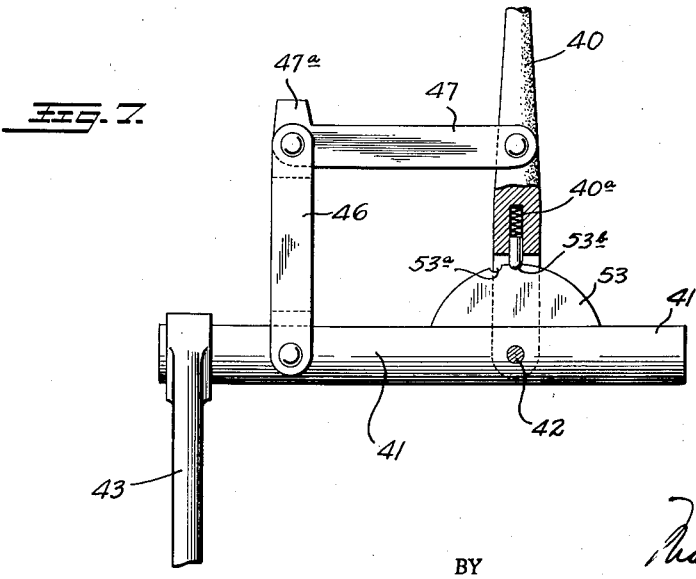

Figures 5, 6, and 7 are elevations of details of the control mechanism.

Figures 8, 9:
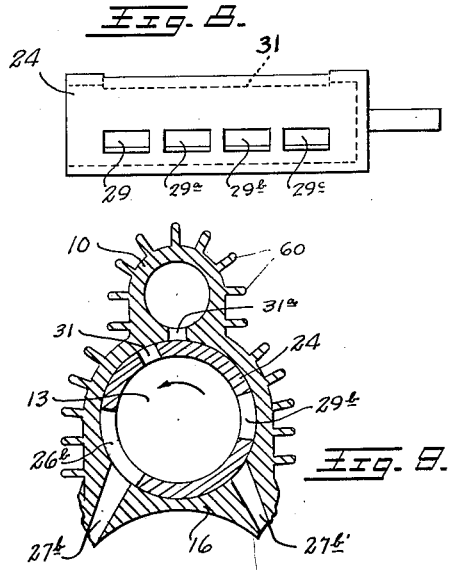

Figure 8 is an elevation of the valve showing the orifices on the reverse side thereof.

Figure 9 is a partial sectional detail showing the valve in position for forward drive.

Figure 10:
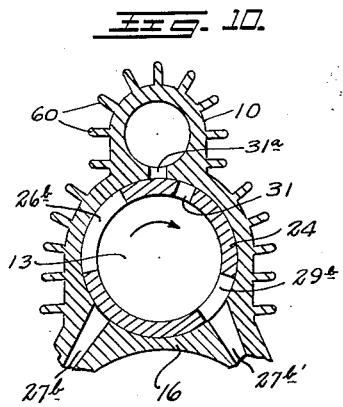

Figure 10 is a similar view showing the valve in position for reverse drive.

The drive mechanism comprises generally a housing 10 having an integral end wall 11 and an opposite removable end wall or plate 12, and the housing is divided into an upper chamber 13, two intermediate chambers 14, and 15 a lowermost chamber 16. The chambers 14 and 15 are separated by a wall or partition 13a. A driven shaft 17 extends through the lower chamber and is supported by suitable bearings 18, 18a in the body of the housing. A series of identical runners 19, 19a, 19b, 19c are keyed on this shaft in spaced relation to one another, the spacing means comprising disks 20, 20a, 20b.

A shaft 21 is also supported by suitable bearings in the housing 10, this shaft being parallel to the shaft 17 and radially disposed with respect to it. A seal for the shafts may be provided in the body of the housing 10 at each end to prevent leakage around the shafts. A series of spaced idler members 22, 22a, 22b, 22c are keyed to the shaft 21 and each has buckets or teeth 23 which mesh with and correspond to the similar buckets or teeth on the runners 19, 19a, 19b, 19c, respectively. These idler members are driven by the rotation of the impellers for a purpose which will be explained.

A control sleeve or valve 24 is suitably mounted with a close fit in the intermediate chamber 14 and this sleeve has a short integral shaft extension 25 projecting through the wall 11 of the housing for the attachment of gearing and control linkage running to the operator's position. As shown in Figure 2, this sleeve has a series of discharge orifices 26, 26a, 26b, 26c, these orifices being in communication, respectively, with the runners in the chamber 15 by means of discharge passages 27, 27a, 27b, 27c, respectively, only one of which is shown, provided in the body of the housing 10. As shown in Figure 3, each of these discharge passages is formed with a restricted discharge port 28 adjacent the chamber 15. As shown in Figure 2, each of the discharge orifices 26, 26c, inclusive, is of a progressively larger size, the size of the orifice increasing in the direction of the line of flow of the fluid in the system, the orifice 26 being the smallest and the orifice 26c being the largest.

Diametrically opposite the sleeve discharge orifices 26—26c, inclusive, the sleeve has a further series of discharge orifices 29, 29a, 29b, 29c, each of the same size, which may communicate with discharge passages 27', 27a', 27b', 27c', one of which is shown in Figure 3, on the other side of the housing 10, opposite the discharge passages 27—27c, inclusive, each of these discharge passages 27', 27a', 27b', 27c', terminating in a restricted port 28' similar to that of 28.

The sleeve 24 has a further single, large discharge orifice 31 radially disposed between the two series described, communicating with a corresponding port 31a provided in the body of the housing 10, and leading into the upper chamber 13 for a purpose which will hereinafter be described.

Referring now to Figure 1, the drive mechanism is shown schematically embodied in an operating system. A prime mover M, which may be the motor of an automobile, for example, is shown driving the fluid pump P of a closed hydraulic system. Liquid, such as an hydraulic fluid, is drawn from the sump S through line L and pumped past the surge tank T through conduit 32 and end plate 12 into the interior of sleeve 24 in the chamber 13. As shown in Figure 3, the sleeve is so oriented that the passages 27—27c, and 27', 27c', all inclusive, are closed and the large passage 31 is open, allowing the hydraulic fluid to flow freely and in large volume into the sleeve 24 and out of the drive mechanism through ports 31, 31a and chamber 13 to the by-pass discharge port 33, into conduit 34, whence it flows into discharge pipe 35 and returns to the sump S.

The sleeve 24, Figure 3, is now in its idling position, allowing the liquid under pressure to by-pass the runners. The surge tank T provides its well known function of ballasting the pressure in the system, the air trapped in the tank forming a cushion to smooth out the pulsations from the pump. As shown, the tank is provided with an adjustable closure plug T' by means of which the compression of the air in the tank may be increased or decreased in accordance with the demands of the system. A relief valve V is interposed in the line between inlet conduit 32 and outlet conduit 35 to relieve the pressure of the system in the event of a stoppage or other emergency, such as the driving mechanism becoming stalled while the power supply continues undiminished.

If the control valve 24 is now turned counter-clockwise from the position shown in Figure 3 to that shown in Figure 9, the orifice 31 will become closed and the orifices 26—26c, inclusive, will become aligned with and open into the discharge passages 27—27c, inclusive, respectively, and the fluid will then flow from the sleeve through these ports and passages, through the corresponding restricted openings 28, and impinge with increased velocity upon the respective runners 19—19c, inclusive, in the form of jets, a jet for each runner. The force of these jets will cause the runners to rotate in the direction of the arrow A, Figure 3, thereby turning the driven shaft 17 in the same direction and furnishing motive power in a forward direction at slow speed. Fluid is now flowing through all the orifices 26—26c, inclusive, and each jet is acting on its respective runner. Further partial counter-clockwise rotation of the valve 24 will result in closing of the single orifice 26, with the fluid continuing to flow in constant volume, but with increased velocity, through the remaining three orifices. This results in a smooth transition to a slightly greater speed of the turbine as the force of the constant volume of the fluid under pressure now acts on only three of the runners, namely, 19a, 19b, 19c, but with greater velocity.

Again, further partial counter-clockwise rotation of the sleeve 24 will close the single orifice 26a, allowing the fluid to flow only through the two orifices remaining open, 26b and 26c, which yields a further smooth transition to a still higher speed of the turbine, all the volume and force of the fluid under pressure now being exerted with still greater velocity against runners 19b and 19c, to turn the shaft 17 at the higher speed.

A final, partial counter-clockwise rotation of the sleeve 24 will result in closing the single orifice 26b, leaving open only the orifice 26c, with the full force of the fluid under pressure being directed with still greater velocity against the single runner 19c, driving the turbine and the shaft 17 smoothly at full speed.

The sleeve cannot now be further rotated in a counter-clockwise direction because the operating link 36, which is operatively connected to sleeve extension 25, engages a stop member not shown, suitably provided on the housing 10 or on the frame of the machine.

During this forward rotation of the runners, the fluid flows around the runners and down into the lower chamber 16, whence it is discharged through lines 38 and 35 and returned to the sump S. Thus, we have a closed hydraulic circuit, using the same hydraulic fluid over and over again. The control valve 24 may be suitably mounted on anti-friction bearings at each end to render its operation smooth and effortless. Suitable seals to prevent leakage of the hydraulic fluid may also be provided around it where necessary.

In the operation of the system, there may be a tendency for the liquid to collect on and adhere to the buckets or teeth of the turbine, thus impairing its driving efficiency. Accordingly, a series of idler gears 22—22c, inclusive, is provided, each having buckets or teeth corresponding with those of the runners and, as shown in Figures 2 and 3, each meshing with its respective adjacent impeller to positively force out or clean out any fluid which may accumulate therein. The spacers 20—20b, inclusive, are provided between the runners of the turbine to prevent leakage of the fluid driving medium between the turbine and the idler gears. These spacers are keyed to the shaft 17 between the runners of the turbine and rotate with it.

To obtain a reversal of the forward drive, the control valve 24 must be shifted clockwise to the idling or neutral position shown in Figure 3, which will stop the flow of fluid to the turbine drive. As the valve is continued in its clockwise movement, the orifices 29—29c, inclusive, will become aligned with their respective discharge passages 27'—27c', inclusive. The fluid in the system continuing to flow in constant volume, the jets will impinge upon the turbine upon the opposite side of its shaft 17 and thus cause a reverse rotation thereof.

Figure 4:
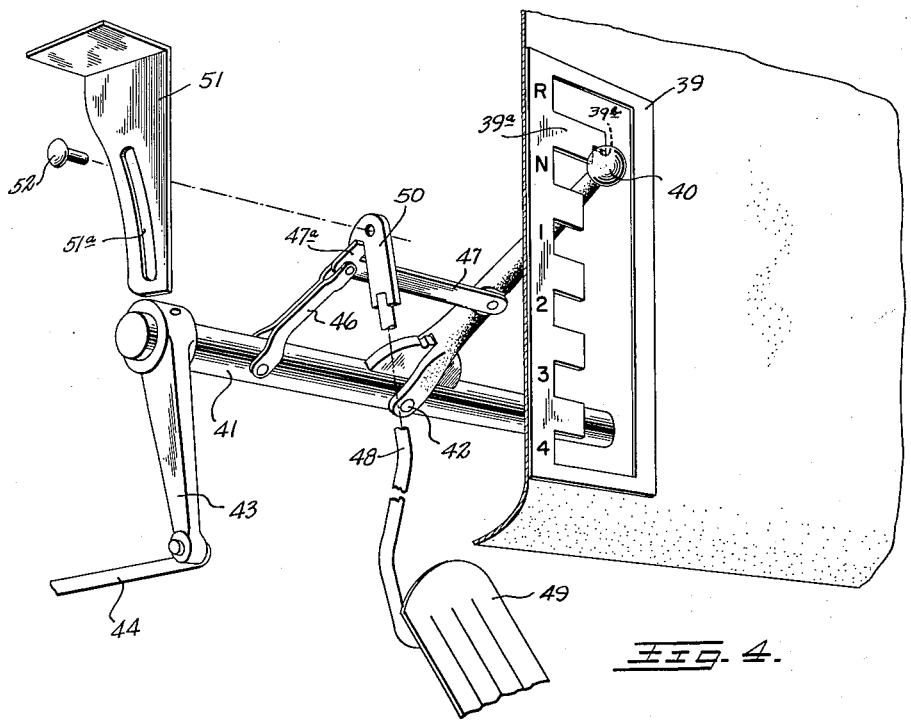
Figure 4 is a perspective view of the manual operating controls for the mechanism.

Referring now to Figure 4, an arrangement is shown for manually operating the control valve 24. A control dial 39 is shown for mounting on the instrument panel or on the steering column of an automotive vehicle, for example, incorporating the system. This dial has a series of spaced notches for receiving a control, or speed shifting lever 40, and as shown, the dial provides position R for reverse, N for neutral or idling position, and forward speeds 1, 2, 3, 4, these latter positions corresponding, respectively, with the conditions created by the flow of fluid through the orifices 26—26c, inclusive, of the control valve 24. It will be obvious that more or less speeds forward may be provided for by a corresponding change in the number of runners for the turbine, orifices for the control valve and notches in the dial. It will be noted, in Figure 4, that the lug 39a of the dial is longer than the remaining lugs. This prevents any possible shifting from a forward motion to a reverse motion without a perceptible pause. In other words, while the lever may be shifted to any forward motion or speed by a straightforward, rectilinear movement of the lever, it can be reversed from such motion only by first being interrupted by lug 39a in such motion before a change of direction takes place. The lug 39a has a notch 39b cut into the lower corner of its free end. The control lever 40 may be moved into this notch, with a corresponding partial reversing movement of the valve 24. The effect of this action will be to close the orifices 26—26c, inclusive, during forward motion of the drive, and only partially open the reverse ports on the opposite side of the control valve, to cause the fluid stream to strike the turbine and exert a braking action thereupon. In this position of the valve, with the prime mover M in operation and the machine or vehicle in forward motion, there will be a reverse liquid pressure built up against the rotating turbine which will act as a brake, retarding the forward motion of the vehicle or machine.

The volume of fluid delivered to the turbine may be varied by varying the speed of the prime mover while the hand lever 40 is maintained in the notch 39b, thus correspondingly varying the braking force exerted. This would be a highly effective brake on long downgrades, saving wear on brakeshoes.

As shown in the drawings, the lever 40 occupies the neutral or idling position, Figure 4, which corresponds to the position of the control valve 24 shown in Figure 3. Movement of the lever to the notch marked 1, Figure 4, will initiate forward motion of the drive mechanism as heretofore described by causing the fluid to flow through the orifices 26—26c, inclusive, to the runners, causing them to rotate. Further movement of the lever 40 to position 2 on the dial will cut out the first orifice 26, causing the fluid, always under constant pressure and volume, to flow through the remaining three, open, orifices. The movement of the lever may thus be continued to position 4, resulting in the successive closing of all of the valve orifices except the last one, 26c, at which time the unit is running freely at its full speed forward, as previously described.

The control lever 40 is connected to the control valve by a suitable mechanism to obtain its operation as indicated above. This may comprise a short rock shaft 41, suitably supported on the frame of the machine, at the lower end of the lever 40 and to which the lever is pivoted at 42. The rock shaft at one end carries a crank arm 43 pinned to the shaft and a short link 44 is pivotally secured at one end to the free end of the crank. The other end of the link 44 is pivotally connected to one end of a longer link 45, Figure 1, the other end of link 45 being connected to the lever 36 which controls the operation of the sleeve valve 24.

The control, or shifting lever 40 is operable from the neutral to first speed position by the operation of the accelerator pedal 49, to which it is connected as follows. A short, double-ended yoke 46 is pivotally mounted on the rock shaft 41 parallel to the lever 40 and spaced therefrom. The two are pivotally joined by an L-shaped link 47 having a short upwardly extending arm 47a. A rod 48 is connected at its lower end to the accelerator pedal 49, and at its upper end to a hooked member 50.

A bracket 51, suitably fixed to the frame of the vehicle or machine, adjacent the hook 50, has a slot 51a provided therein. A headed pin 52 projects through said slot and into the hooked member 50 to support and guide the latter in its movements.

The lever 40 is bifurcated at its lower end and its body is bored at 40a to receive a spring and a detent, as shown in Figure 7. A quadrant 53 is fixed to the rock shaft 41 between the legs of the bifurcated portion, and this quadrant has a pair of spaced notches formed in its perimeter to receive the detent and hold the lever 40 in either one of two positions. The position 53a corresponds to a position where the lever 40 is seated in the depth of one of the notches in the dial 39, and the position 53b corresponds to the position shown in Figures 4 and 7, where the lever is free of the notches and may be moved from one speed to another.

With the turbine at idling speed, the hooked member 50 will engage the short arm 47a, and pressure on the accelerator pedal 49 will move the lever to position 1 or first forward speed. At this point, the arm 47a will pass out of the reach and out of the control of the hook 50 and further shifting of the lever 40 must be manual, as described above, or automatic, as about to be described.

For automatic operation as shown in Figure 1, a governor is interposed between the control lever 40, valve 24. A centrifugal type governor 54 of a well known construction is mounted directly on the driven shaft 17 and fixed to rotate therewith. A lever 55, pivoted at 56 to some fixed part of the machine intermediate the driven shaft 17 and link 45, is connected at one end to the movable sleeve 54a of the governor and at its other end with a sliding connection 57 to the link 45. Stop members 58 are fixed to the link 45 at spaced points on each side of the sliding connection 57 and a compression coil spring 59 is loosely mounted on the link on each side of lever 55, between the sliding connection and the stop member.

In operation, as the driven shaft 17 comes up to speed the centrifugal governor will actuate the lever 55 to pull on the link 45 in a known manner, thus moving the lever 36 counter-clockwise to operate the valve 24, and as the speed of the shaft 17 increases, the valve 24 will be pulled in that direction in proportion to the increase in speed of the shaft, until the valve is so positioned that the turbine is being driven at full speed. The operation of the turbine may be taken away from the governor at any time merely by shifting the hand control lever 40 as desired, and the governor will be held inoperative during hand control by the cushion provided on each side of the lever 55 by means of springs 59.

To dissipate such heat as may be generated by the operation of the mechanism, the housing 10, including its end walls 11 and 12, may be provided with integral fins 60, which will function in a known manner to cool the entire mechanism. The fluid medium used, preferably a light oil, should adequately lubricate the few moving parts of the device.

It will be clear from the foregoing description that if the volume of fluid which can be accommodated by the final runner 19c of the turbine is less than the capacity of the pump P, the final drive will operate at a speed greater than that of the prime mover, thus providing a built-in overdrive without any additional mechanism. This may be accomplished by varying the capacity of the runner, or the pump, as desired.

Changes in the construction and design of the invention may be made without departing from the spirit thereof as defined by the appended claims.

I claim:

1. A variable speed drive comprising a turbine having a casing, a series of runners rotatably supported therein and capable of forward, reverse and idling drive, a cylindrical valve chamber in said casing adjacent said runners, a sleeve valve rotatable in said chamber, said valve having separate series of ports formed in the wall thereof, said series each being radially disposed with respect to one another to direct fluid to one side or the other of the axis of rotation of said runners to drive them either in a forward or reverse direction, means for actuating said valve to direct fluid for forward or reverse rotation of said runners, said valve having a neutral port intermediate said series, said neutral port comprising a slot coextensive in length with the combined longitudinal extent of each of said series, said casing having a port coextensive in size with said neutral port, and a conduit adjacent said last named port for receiving the flow from said neutral port when the valve is in neutral position.

2. A variable speed drive mechanism comprising a housing having a series of chambers, said series including a first bypass chamber, a valve chamber and a valve therein capable of adjustment to forward, reverse or neutral drive, a turbine chamber and a turbine therein, means for supplying fluid under pressure to said valve and turbine, a discharge chamber and means in said chamber for positively discharging fluid from said turbine, and a discharge conduit connected to said last named chamber; a first partition between said valve chamber and said first bypass chamber and ports in said partition and valve in communication with one another when said valve is in neutral position; a second partition between said valve and turbine chambers with ports on opposite sides of said partition, and corresponding ports in said valve adapted for registry with the respective adjacent port of said second partition when the valve is adjusted for forward or reverse drive, all of said chambers being arranged in a parallel series.

3. An hydraulic drive mechanism comprising a housing having a turbine therein, a rotary sleeve valve member in said housing adjacent said turbine, ports in said valve and housing for operatively connecting said valve and turbine, means on said mechanism for operating said valve to direct fluid to said turbine, inlet and outlet means for delivering and discharging fluid to and from said housing and valve, including a bypass within the housing and a port in said valve in communication therewith for bypassing the fluid around said turbine, said housing having a port adjacent said bypass, said port in said valve being coextensive in area with that of said last named port in said housing, and means driven by the turbine for cleaning the fluid therefrom at a point remote from said valve, the turbine being positioned between said valve and cleaning means.

4. An hydraulic drive mechanism according to claim 3 in which the axes of said valve, turbine and cleaning means all lie in a common plane.

5. A drive mechanism according to claim 3 in which the valve, turbine and cleaning means are positioned adjacent one another in the order named, and wherein fluid delivered to the turbine on one side of its rotation axis is discharged therefrom at a point not exceeding 180° from the point of delivery.

References Cited in the file of this patent

UNITED STATES PATENTS

| | | |
|---|---|---|
| 101,725 | Frisbie | Apr. 12, 1870 |
| 525,121 | Shepard | Aug. 28, 1894 |
| 622,013 | Oliver | Mar. 28, 1899 |
| 649,541 | Flowers et al. | May 15, 1900 |
| 906,425 | Hodges | Dec. 8, 1908 |
| 1,016,199 | Beard | Jan. 30, 1912 |
| 1,073,824 | Smith | Sept. 23, 1913 |
| 1,354,209 | Peterson | Sept. 28, 1920 |
| 1,368,869 | Whiting | Feb. 15, 1921 |
| 1,648,092 | Whiting | Nov. 8, 1927 |
| 1,926,692 | Tarbox | Sept. 12, 1933 |
| 2,257,108 | Cornwell | Sept. 30, 1941 |
| 2,676,497 | Ahlen | Apr. 27, 1954 |
| 2,678,106 | Vonderheide | May 11, 1954 |

FOREIGN PATENTS

| | | |
|---|---|---|
| 27,868 | Switzerland | Sept. 25, 1902 |
| 524,775 | France | May 18, 1921 |